UNITED STATES PATENT OFFICE.

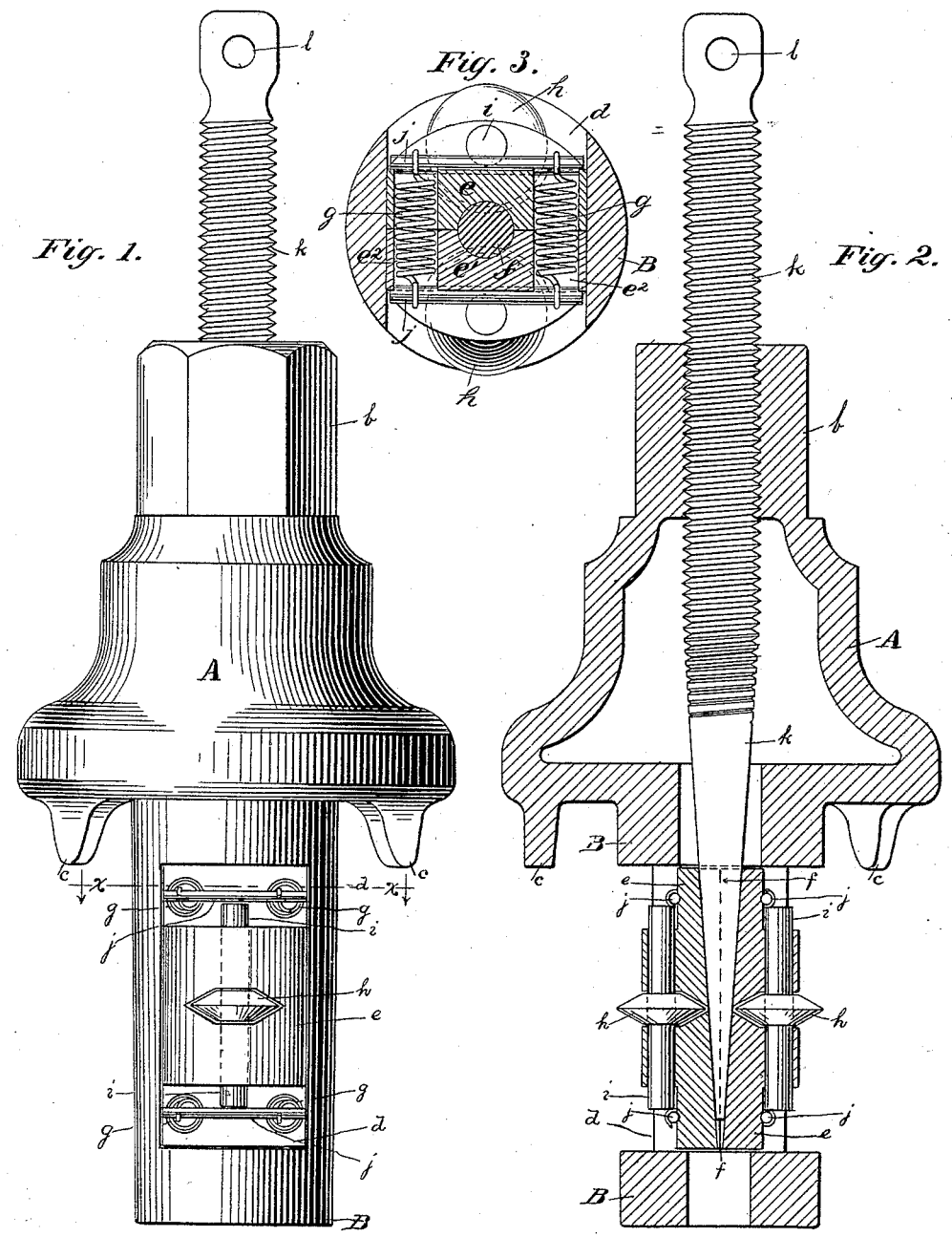

TIMOTHY BYRNE, OF BLOOMINGTON, ILLINOIS.

PIPE-CUTTER.

SPECIFICATION forming part of Letters Patent No. 422,115, dated February 25, 1890.

Application filed February 23, 1889. Serial No. 300,816. (No model.)

*To all whom it may concern:*

Be it known that I, TIMOTHY BYRNE, of Bloomington, in the county of McLean and State of Illinois, have invented a new and Improved Pipe-Cutting Machine, of which the following is a full, clear, and exact description.

The invention relates to machines for cutting pipes, tubes, or flues in boilers, &c.

The object of the invention is to provide a new and improved cutting-machine, which is simple and durable in construction, very effective in operation, and specially designed for cutting the pipes from the inside in case the exterior face of the pipe cannot be conveniently reached.

The invention consists in certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement. Fig. 2 is a central section of the same, and Fig. 3 is a sectional end elevation of the same on the line $x\ x$ of Fig. 1.

The improved pipe-cutting machine is provided with a frame or head A, provided at one end in its center with a hub B, and also with lugs $c$, adapted to rest against and surround the pipe to be cut. In the hub B is formed a slot $d$, in which are fitted to slide blocks $e$ and $e'$, which, when in their innermost position, form a conical aperture $f$, into which fits the similarly-shaped end $k'$ of a feed-screw $k$, screwing into the outer hexagonal end $b$, formed on the head A. The extreme outer end of the feed-screw $k$ is provided with an aperture $l$, for conveniently inserting a rod or fastening any other device for turning the said feed-screw $k$, so as to move the latter in and out of the head A.

Each of the blocks $e$ and $e'$ is provided with a suitable bearing for a pin $i$, extending longitudinally and carrying in its middle a cutting-disk $h$, preferably of the shape shown in the drawings and extending into convenient recesses formed in the blocks $e$ and $e'$. When the latter are in their innermost position, the outer cutting-edges of the disks $h$ are in line with the periphery of the hub B. The ends of the pins $i$ abut against the transversely-extending pins $j$, resting on the blocks $e$ and $e'$, respectively.

The two pins $j$, located opposite each other, are connected with each other by coil-springs $g$, secured by their ends to the respective pins and passing through apertures $e^2$, formed in the blocks $e$ and $e'$, as plainly shown in Fig. 3. The springs $g$ serve to press the blocks $e$ and $e'$ toward each other, at the same time permitting an outward sliding motion of the same against the tension of the springs, and the said springs also hold the pins $j$ in place, so that the pins $i$ are prevented from moving longitudinally in their respective bearings on the blocks $e$ and $e'$.

The operation is as follows: When the operator desires to cut a pipe, tube, or flue in a boiler or other apparatus, he inserts the hub B into the pipe or tube, so that the lugs $c$ of the head A rest against the boiler-head. The operator then turns the feed-screw $k$ so that the latter moves inward, and its conical end $k'$ presses the blocks $e$ and $e'$ apart, whereby the cutting-disks $h$, held in the said blocks, engage the surface of the respective pipe or tube to be cut. The operator now, by suitable means—such as a wrench, crank-arm, &c.—turns the head A, whereby the hub B carries the disks $h$ around inside of the pipe, so that the cutting-edges of the said disks cut an annular groove into the pipe, tube, or flue. The operator then screws up the feed-screw $k$, so as to press the blocks $e\ e'$ farther into the groove of the pipe, after which the head A is again turned so that the said groove is deepened.

The above-described operation is repeated until the cutting-disks $h$ have cut clear through the pipe. The operator then screws the feed-screw $k$ outward, whereby the blocks $e$ and $e'$, carrying the cutting-disks $h$, are again moved inward by the action of the springs $g$. When the disks $h$ are in their innermost position, the machine can be withdrawn from the part of the pipe left in the boiler-head. Thus it will be seen that by a very simple device I am enabled to conveniently cut pipes, flues, tubes, &c., from the inside, in case the external face of the pipe, tube, or flue cannot be reached by suitable cutting-tools. It will be seen that with this machine I am enabled to cut flues and tubes of locomotive and other boilers, so that the same can be more readily removed for cleaning the scale therefrom or for repairing the same or for other purposes.

It will further be seen that with this machine I am enabled to conveniently remove tubes or flues in boilers ready to be lap-welded and without battering, loosening, or splitting the ends of such tubes or flues.

Having thus described my invention, what I claim as new, and desire to secure by Letters Patent, is—

1. In a pipe-cutting machine, the combination, with a frame having a slotted hub, of a cutter-carrier formed of two sections held together by springs and provided with a conical aperture, and a feed-screw having a conical end projecting into the conical aperture of the carrier, substantially as described.

2. In a pipe-cutting machine, the combination, with an internally-screw-threaded frame having a slotted hub and lugs, of a cutter-carrier formed of two sections, each section having a cutter on its outer face and a recess on its inner face, coiled springs having their ends secured to the sections, and a feed-screw having a conical end, substantially as herein shown and described.

TIMOTHY BYRNE.

Witnesses:
LOREN L. CARTER,
THOMAS LITTLE.